(12) United States Patent
Theiß

(10) Patent No.: US 12,027,834 B2
(45) Date of Patent: Jul. 2, 2024

(54) COMPACT WINDING DEVICE FOR A FLEXIBLE LINE

(71) Applicant: igus GmbH, Cologne (DE)

(72) Inventor: Georg Theiß, Cologne (DE)

(73) Assignee: igus GmbH, Cologne (DE)

( * ) Notice: Subject to any disclaimer, the term of this patent is extended or adjusted under 35 U.S.C. 154(b) by 378 days.

(21) Appl. No.: 17/600,926

(22) PCT Filed: Apr. 1, 2020

(86) PCT No.: PCT/EP2020/059242
§ 371 (c)(1),
(2) Date: Oct. 1, 2021

(87) PCT Pub. No.: WO2020/201348
PCT Pub. Date: Oct. 8, 2020

(65) Prior Publication Data
US 2022/0166203 A1   May 26, 2022

(30) Foreign Application Priority Data
Apr. 1, 2019 (DE) ............ 20 2019 101 862.3

(51) Int. Cl.
*B65H 75/44* (2006.01)
*H02G 11/02* (2006.01)

(52) U.S. Cl.
CPC ......... *H02G 11/02* (2013.01); *B65H 75/4407* (2013.01); *B65H 75/4415* (2013.01);
(Continued)

(58) Field of Classification Search
CPC ............... H02G 11/02; B65H 75/4407; B65H 75/4415; B65H 75/4434; B65H 75/4449; B65H 75/4457; B65H 2701/34
See application file for complete search history.

(56) References Cited

U.S. PATENT DOCUMENTS 3,061,234 A   10/1962   Morey
3,128,857 A * 4/1964   Walton ................. H02G 11/02
                                                            242/388.6
(Continued)

FOREIGN PATENT DOCUMENTS

CH        629457 A5    4/1982
CN     107431345 A    12/2017
(Continued)

OTHER PUBLICATIONS

The International Bureau of WIPO, English translation of International Preliminary Report on Patentability for PCT Application No. PCT/EP2020/059242, dated Sep. 28, 2021.
(Continued)

*Primary Examiner* — Sang K Kim
(74) *Attorney, Agent, or Firm* — Cahn & Samuels, LLP

(57) ABSTRACT

The invention relates to a winding device (10) for a line (1), such as a cable or hose, including a stationary frame (11) and a winding drum (12), which is rotatably mounted on said frame and has an interior (12B). From the outside (12A) of the winding drum (12), the line can be wound or unwound. An inner rotary guide (18) in the interior (12B) guides the line (1) continuously from a fixed point (F) fixed with respect to the frame to a rotation point (R) on the winding drum (12) and defines a line course, having two opposite windings (18A, 18B) about the axis of rotation (A), and a rotatable deflection element (18C), in which the line changes over. According to the invention, the winding drum (12) has a first cut-out (15A) at a first end, on the side of the rotation point (R), which cut-out opens out axially and at an end face, and a retaining part (19B) at the other end, which retaining part is rotationally fixed to the frame, has a second cut-out (15B), which opens outward in a plane perpendicular to the axis of rotation (A). By virtue of the cut-outs (15A, 15B) in combination with the special rotary guide (18), the line (1)

(Continued)

to be wound can be continuously routed without interruption and without rotational coupling or be subsequently attached, from the outside (12A) through the first cut-out (15A), in the inner rotary guide (18) and from the fixed point (F) of the rotary guide through the second cut-out (15B) or vice versa.

17 Claims, 3 Drawing Sheets

(52) U.S. Cl.
CPC ..... *B65H 75/4434* (2013.01); *B65H 75/4449* (2013.01); *B65H 75/4457* (2013.01); *B65H 2701/34* (2013.01)

(56) References Cited

U.S. PATENT DOCUMENTS

| | | | |
|---|---|---|---|
| 3,539,123 | A | 11/1970 | Shutt |
| 4,897,512 | A * | 1/1990 | Johnston ............ B65H 75/4407 242/129.62 |
| 5,560,391 | A | 10/1996 | Bantaculo |
| 6,113,023 | A * | 9/2000 | Uefling .................. H02G 11/02 242/388.6 |
| 8,727,084 | B1 * | 5/2014 | Kuker .................. B65H 75/425 242/378.2 |
| 10,779,386 | B2 * | 9/2020 | Limmer ............. B65H 75/4449 |
| 11,235,947 | B2 | 2/2022 | Theiss |
| 2020/0185900 | A1 * | 6/2020 | Theiss .................... F16G 13/16 |

FOREIGN PATENT DOCUMENTS

| | | |
|---|---|---|
| DE | 103 00 960 A1 | 7/2004 |
| DE | 202010001084 U1 | 5/2010 |
| DE | 202011107804 U1 | 2/2011 |
| DE | 10 2012 110 967 A1 | 5/2013 |
| DE | 202016102087 U1 | 7/2017 |
| EP | 0 895 505 B1 | 7/2002 |
| EP | 1 445 228 A2 | 8/2004 |
| EP | 2 535 303 A1 | 12/2012 |
| WO | 80/00643 A1 | 4/1980 |
| WO | 2011/086198 A2 | 7/2011 |

OTHER PUBLICATIONS

European Patent Office, International Search Report for PCT Application No. PCT/EP2020/059242, dated Jul. 24, 2020, pp. 1-2.
European Patent Office, English Abstract for CH629457 A5, printed on Sep. 24, 2021.
European Patent Office, English Abstract for DE10300960 A1, printed on Sep. 24, 2021.
European Patent Office, English Abstract for EP1445228 A2, printed on Sep. 24, 2021.
European Patent Office, English Abstract for EP2535303 A1, printed on Sep. 24, 2021.
Intellectual Property India, Examination Report for Application No. 202137044388, dated Jan. 5, 2023, pp. 1-5.
National Institute of Industrial Property, Preliminary Office Action, dated Nov. 14, 2023, pp. 1-4.
Intellectual Property Office of Singapore, Invitation to Amend, Mar. 10, 2023, pp. 1-3.
The State Intellectual Property Office of People's Republic of China, Office Action in CN App. No. 202080032713X, dated Jan. 25, 2024, pp. 1-5.
The State Intellectual Property Office of People's Republic of China, Search Report in CN App. No. 202080032713X, dated Jan. 25, 2024, p. 1.
European Patent Office, English abstract for CN107431345A, retrieved Feb. 12, 2024.

* cited by examiner

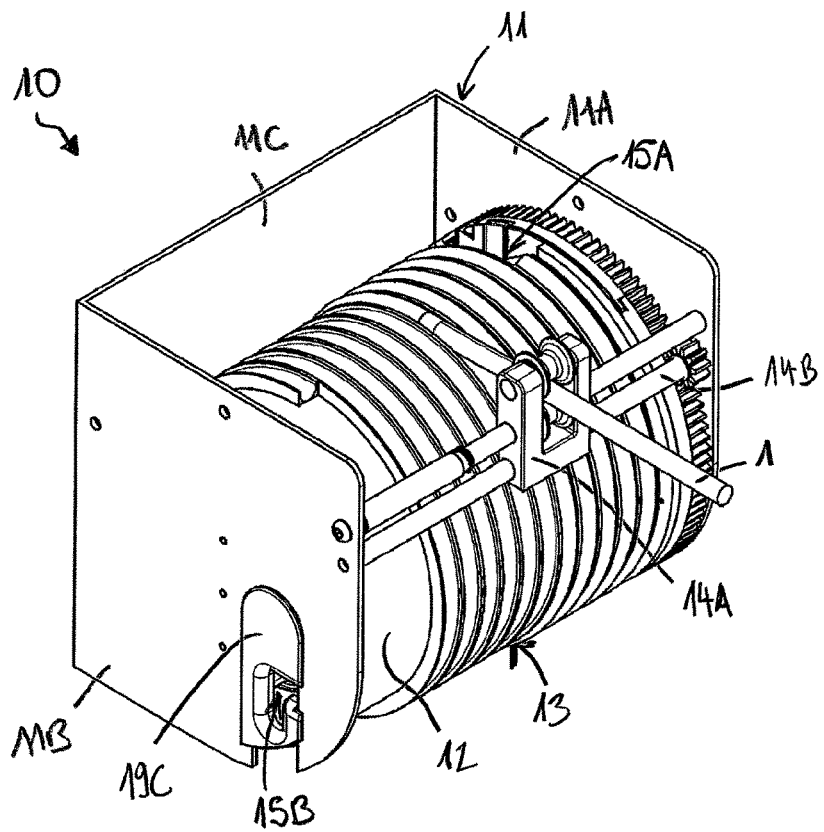
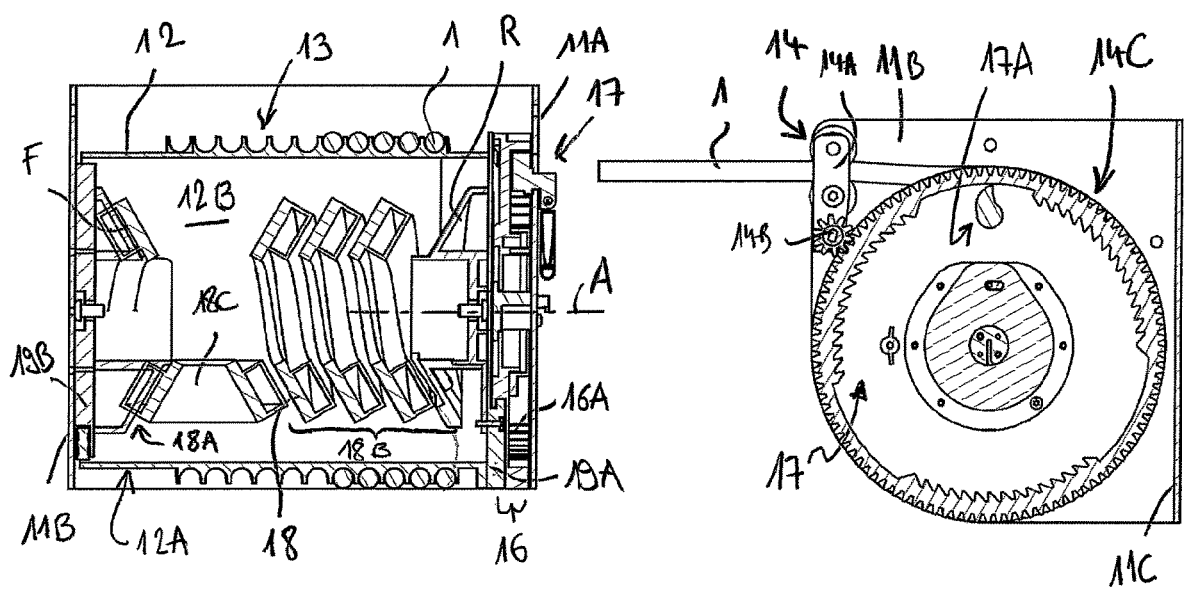
FIG.1A
FIG.1B
FIG.1C

COMPACT WINDING DEVICE FOR A FLEXIBLE LINE

The invention concerns a winding device for winding and unwinding a flexible line like a cable, a hose or the like, in particular for a line which is ready-made ready for use, for example with plug connectors, or which is already connected to an apparatus or an installation.

The invention concerns in particular such a winding device having a frame which can be stationarily mounted and a winding drum which is rotatable with respect thereto and on the outside of which the desired line can be selectively wound or unwound or wound on or off and which has an inner rotary guide for interruption-free guidance of the line from a fixed point which is fixed with respect to the frame to a rotary point which rotates with the winding drum.

Interruption-free in relation to the line means in the present case that, for the transition from the stationary part to the rotating part, there is no need—as is generally usual—to provide a slip ring for an electric line, a rotary coupling for a hose or the like, as an interface relative to the relatively rotatable part of the winding device.

A winding device of that kind, of the general type set forth, in accordance with the classifying portion of claim 1, is already known for example from U.S. Pat. No. 3,061,234A. In that case an inner drum arrangement with two relatively rotatable inner auxiliary drums and therebetween a direction-changing disc are proposed as the inner rotary guide for interruption-free guidance of the line. That arrangement predetermines a line configuration involving two oppositely directed windings, namely a first winding direction about the axis of rotation on the first inner drum, a rotatable change in direction by the direction-changing disc and a second opposite winding direction on the second inner drum.

That winding device avoids the need for slip rings, rotary couplings or the like, but is structurally really complicated and expensive. In addition that structure does not readily permit subsequent fitment of a line. A similar winding device of the general kind set forth, but a structure which is even more complex, is known from EP 0 895 505 B1.

A development in regard to the rotary guide for interruption-free guidance of a line from a fixed point to a rotary point was already proposed with the winding device in accordance with patent DE 10 2012 110 967 B4 to the present applicant. That structure uses an alternative to the previously known interruption-free rotary guide, but it is not particularly compact, in particular in the axial direction.

Particularly in the case of safety-critical applications like for example control devices which are already wired up with cables in automation technology or installation control situations, subsequent intervention in the line which is already connected ready for use is typically unwanted. The above-mentioned structures do not permit retro-fitment, which is simple in that sense, of a winding device for winding on and unwinding a line which is already ready for operation.

There is accordingly a wish for even a line which is connected or ready-made so as to be already ready for operation at both sides to be subsequently equipped with a winding device.

A first object of the present invention is accordingly to develop a winding device of the general kind set forth such that with a compact structure it is possible for a line which is already connected or which is ready-made in a state of already being ready for operation to be subsequently equipped with the winding device for the purposes of selective winding and unwinding. That is to be made possible for the end user on site in particular with a comparatively low level of assembly complication or without special qualification.

According to the invention that is already achieved in a winding device according to the classifying portion of claim 1 in that at a first end the winding drum has at least a first opening which opens outwardly at the end with respect to the axis of rotation and in particular generally in the axial direction, for example parallel or inclinedly relative to the axis of rotation. In that case, the first end corresponds to that side at which the point of rotation of the inner rotary guide is also provided.

According to the invention there is further provided at the opposite second end of the winding drum, a holding portion which is connected non-rotatably to the frame with respect to the axis of rotation and which in turn has at least a second opening which again opens outwardly but generally in a radial direction considered perpendicularly to the axis of rotation.

The provision according to the invention of the openings at both sides, which so-to-speak serve as passage openings for a line which is already connected at an end and/or is ready-made for example with plug connectors, makes it possible in particular that the line which is to be stowed or wound in dependence on the respective application can be displaced from the outside through the first opening, in particular in the radial direction into the internal space or the winding drum, to the point of rotation of the rotary guide, through the inner rotary guide and from the fixed point thereof, in particular axially from the internal space or the winding drum, and through the second opening.

It will be appreciated that for installation or retro-fitment the line can also be laid or can be fitted to the winding device in a completely equivalent fashion in the reverse direction, starting from the second opening through the rotary guide by way of the first opening on to the drum periphery, the line-laying direction or sequence being immaterial in that respect. It is optionally also possible to provide at one side or at both sides, a respective plurality of corresponding openings in order to selectively pass the line therethrough depending on the length to be wound.

The two openings form outwardly open accesses to the internal space or out of same, that is to say in a relatively simple fashion they allow an existing portion of the line to be introduced into the internal space or the rotary guide there and passed out of same again without the line having to be cut and re-joined for that purpose—unlike the situation with known winding devices like for example those in U.S. Pat. No. 3,061,234 A or EP 0 895 505 B1.

The two outwardly opening openings or apertures can basically be of any geometry, they should only be of a sufficiently free cross-section for the line which is selected in dependence on the application involved. In that respect the size of connected plug devices or apparatuses which are already connected to the line at the end is basically not an important consideration as any portion of sufficient length of the line can be inserted. Basically, there are also no limitations in regard to the type or cross-section of the line, but in that respect the line must enjoy sufficient flexibility for winding thereof.

Accordingly in principle for any desired application, a line which is already installed ready for operation, for example an existing supply cable or an already existing hose can be subsequently received by the winding device and selectively wound on and off thereby so that the desired line is stowed away in user-friendly fashion when not in use. Preferably only precisely one line is received, but it would also be conceivable to subsequently fit a winding device to a plurality of lines which for example supply the same portable device.

Particularly preferably an interruption-free inner rotary guide is used, which has a belt-like line guide device involving the structure in accordance with the teaching of WO 2011/086198 A2 to the present applicant. That line guide device involves a structure with two oppositely directed partial helices and therebetween a variable direction-changing arc for receiving one or more lines, wherein here preferably precisely one line is accommodated. That kind of line guide device therefore forms in particular one or more first spiral layers in which an accommodated line is wound about the axis of rotation in the first winding direction, one or more second spiral layers in which the accommodated line is wound about the axis of rotation in the opposite direction in the second winding direction, and a direction-changing arc which connects the two spiral layers and in which the received line is changed over. Such a line guide device is easier to fill, is of a more compact structure and is mechanically less fragile or requires less maintenance than the previously known interruption-free rotary guides referred to in the opening part of this specification, in particular those with two oppositely operable drums and a direction-changing disc.

Such a belt-like line guide device preferably has its fixed point secured to the holding portion and its rotary point fixed at the opposite end (the first end) at a rotatable part of the device, in particular the driven side of a drive device on the frame or on the coupling flange of the winding drum. In that case one of the connections or fixings, in particular of the rotary point, can also be releasable in order to possibly remove the line guide device.

In that respect the preferred belt-like line guide device can have a continuous or region-wise one-part support belt. In a preferred embodiment however a belt-like line guide device is used, which is composed of individual members, in particular members of plastic, in the shape of a sector of a circle. In that case to simplify assembly or retro-fitment, the individual members preferably have at the radial outward side a continuous gap which can be flexibly expanded in order to insert a line into the respective member and thus to successively introduce same into the belt-like line guide device.

Irrespective of the type of structure the inner rotary guide can be fixedly connected to the holding portion to constitute a guide unit. In a preferred embodiment the guide unit and the winding drum are mounted to the frame relatively releasable from each other. For that purpose either only the winding drum or only the guide unit or both thereof can be mounted so as to be removable from the frame, preferably in a small number of steps and with least possible tool usage.

Basically the line guide device, in particular the guide unit with same, is accommodated preferably completely, in particular considered axially and radially, in the internal space in the winding drum so that this provides a particularly compact structure.

There are also different structures in accordance with the invention in regard to the winding drum. The winding drum for example can be in one piece, in particular with a predominantly closed outside surface, in the form of the peripheral surface of a cylinder. The cross-section can be circular-cylindrical or polygonal. Irrespective thereof at the first end it can have a coupling flange with which it can be releasably fitted to the frame.

The winding drum can also be of a multi-part structure comprising a number of releasably connected individual parts, optionally with an outside surface which is not closed, for example similar to a reel, for example a hose reel or a wire reel or the like with a plurality of axial bars over the periphery, in relation to which the line can be wound on and off.

The winding drum can also be of a multi-part configuration with a predominantly closed outside surface, in particular a cylindrical peripheral surface comprising at least two peripheral surface portions which can be releasably connected together, for example substantially comprising two semi-cylindrical shell portions, wherein at least some of the individual parts are removable from the frame.

Particularly in the case of a line which is fixedly connected at both sides, it is advantageous if the winding drum has an insertion slot for insertion of a line, the slot extending from the first opening and passing continuously to the second end, in particular extending in the axial direction, so that no end-mounted device has to be passed through the drum and the drum diameters can be smaller.

The drum can have an end flange only at one side, at the first end, and can be mounted in cantilever relationship, and/or at the other end can be mounted or held rotatably in particular by the holding portion which is non-rotatably connected to the frame.

In a preferred development the winding device has a drive device on the frame, in particular for self-actuated or automatic winding-on of the line. In the assembled position the drive device can be torque-transmittingly coupled to the first end of the winding drum, in particular releasably with the coupling flange. Different drives can be considered. Preferably the drive is an energy-saving drive device which is in the form of a spring drive for automatically rolling up the line, and which stores energy in the unrolling operation. In that respect any suitable conventional spring drive can be considered, in particular as is known for cable winding devices, for example a coil spring drive with a flat spring which is wound in a spiral configuration, or a roller spring drive. It is also possible to provide a spring drive involving spring shaft technology in a coaxial relationship, for example in a hollow support shaft of the inner rotary guide.

For simple and user-friendly operation of the winding device the spring drive preferably has an automatic winding arrangement with a reverse-motion lock, for example with a locking pawl mechanism. In that way, by pulling on the line with a short abrupt movement it is possible to trigger automatic winding-on or winding-on can be stopped, even at a distance from the winding device.

In particular if the winding drum has an end flange only at one side, at the first end, it is preferably provided that the holding portion is in the nature of a support disc, with a support region which at least region-wise is in the shape of a circular ring and on which the second end of the winding drum is slidingly or rollingly rotatably mounted. That can preferably be achieved by means of support rollers, on which an inward side of the winding drum is rotatably supported. Irrespective thereof, such a holding portion can serve virtually as a replacement for the end flange at the second end and/or can form the fixed point of the inner rotary guide, that is fixed with respect to the frame.

The holding portion can serve as a component part of the guide unit mounted as a unit, with the inner rotary guide, in particular if it is to be axially removeable from the winding drum which is supported in cantilever relationship.

In a mechanically simple structure the frame has two oppositely disposed holding plates, between which both ends of the winding drum are held, in particular being supported rotatably at both sides. In that case, one holding plate can be mounted to the frame pivotably with respect to the other to make it easier to remove the winding drum. Alternatively, the frame, in particular with a winding drum which has an end flange only at one end, can have precisely one holding plate at the first end of the winding drum. In that case, the holding portion is preferably fixed in opposite relationship at a holding shaft which is coaxial with respect to the axis of rotation. That shaft can be in the form of a hollow shaft and, for example, can accommodate a spring shaft as an alternative to a coil spring drive.

In an embodiment there can be provided a winding adjustment mechanism having a guide head which is displaceable parallel to the axis of rotation for guiding a line while it is being wound on, wherein the guide head is coupled by way of a transmission means, in particular a spindle drive or the like, to the winding drum or the driven side of the drive device, in particular being mechanically coupled, so that the winding-on point of the line on the winding drum is displaced in the axial direction during rotation of the drum, in particular by at least one line diameter for each revolution.

Such a winding adjustment mechanism provides for uniform and careful spiral winding and unwinding of the line without unwanted crossings thereof by achieving controlled or orderly placement of the line on the drum, that is to say with the rotation of the drum the line is displaced virtually continuously in the axial direction. The displacement is preferably at least one cable diameter for each drum revolution. The adjusting mechanism in the form of a guide head for example has a laying hand or at least one guide roller, or two opposite guide rollers, in order to deal with the line gently and carefully. Mechanical coupling in conjunction with a spring drive is preferred so that there is no need for a dedicated motor drive and corresponding control system. In that respect it is possible to use any known structure, possibly even with automatic end directional reversal for travelling to and fro, like for example in DE 10300960 A1 or in EP 1 445 228 A2.

In addition or in particular as an alternative to the winding adjustment mechanism, in a structurally simpler solution, it is possible to achieve controlled winding and unwinding in a spiral configuration if the winding drum has an at least predominantly cylindrical casing with a spiral profiling at the outside for winding the line on in guided relationship. In that case the winding spacing in the axial direction should preferably correspond to the maximum receiving cross-section of the inner rotary guide. In addition, it is optionally possible to provide a pressure roller which is extended in the axial direction and which presses the line into the profiling, for example by a spring loading.

To enjoy increased freedom in regard to the design configuration, better electrical insulation and/or a reduction in weight of the rotating parts, the inner rotary guide, the winding drum and/or the holding portion can at least predominantly be made from plastic parts, for example from injection mouldings.

The preferred belt-like line guide device in the form of an inner rotary guide for the line preferably has a tensile strain-relief means for the line at both sides. For that purpose, at the first end, in particular at the first opening, the winding drum can have a holding tongue at which a strain-relief means for the line is provided.

In one of many possible applications, the winding device is used for precisely one electrical control signal cable and/or power supply cable which can be wound and unwound, wherein that cable is inserted or guided in interruption-free manner through the inner rotary guide from the fixed point to the rotary point.

The winding device affords many possible uses. It can be used in particular for retro-fitment of a line which is already installed ready for operation, in particular a cable, in order to provide for compact stowage of same and to wind and unwind it as required. The winding device permits in particular retro-fitment of a line which is ready-made or which is already connected at least at one end and/or a line which is connected to a portable piece of equipment, like for example in a factory or workshop. Purely by way of example the winding device can be used for example for stowing the cable of a hand-held programming unit of an industrial robot so that time-consuming winding and stowage by hand is eliminated and the cable is stored in a protected manner in operation of the equipment. Preferably the winding device has a removable casing to protect the moveable parts and the line which has been wound on.

Further features and advantages of the invention will be apparent without restriction on the scope of protection from the more detailed description hereinafter of preferred embodiments, with reference to the accompanying figures in which:

FIGS. 1A-1G shows a first embodiment of a winding device in an assembled perspective view (FIG. 1A), in longitudinal section (FIG. 1B), in a cross-section (FIG. 1C) and in different exploded views of essential components (FIGS. 1D-1G);

Figure 1G:
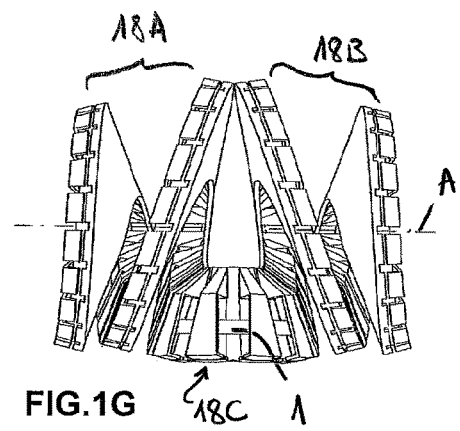

In FIGS. 1A-1G, a winding device is indicated generally at 10. The winding device 10 serves for stowing and winding and unwinding as required for a diagrammatically illustrated flexible line 1, for example an electric cable for power supply and/or data transmission. The winding device 10 includes a frame 11 having two oppositely disposed holding plates 11A, 11B, between which a hollow, circular-cylindrical winding drum 12 is mounted rotatably about an axis of rotation A. The holding plates 11A, 11B are here fixedly connected to a rear mounting plate 11C and form a frame 11 for the rotatable winding drum, the frame being approximately C-shaped in plan view and being fixed in space. The line 1 can be wound in a spiral configuration on the outside 12A of the winding drum 12, for which purpose an optional profiling 13 can be provided at the outside 12A of the winding drum 12. The profiling 13 promotes controlled winding and unwinding of the line in a spiral and is correspondingly arranged in a helical form around the axis A and is approximately circular in cross-section (FIG. 1B).

The embodiment shown in FIGS. 1A-1G further has an optional winding adjustment mechanism 14, having a guide head 14A which is displaceable parallel to the axis of rotation for guiding the line 1 during winding thereof. The guide head 14A is mounted displaceably parallel to the axis of rotation by way of a spindle drive having a threaded spindle 14B by way of an external tooth arrangement 14C, which is non-rotatably connected to the winding drum 12, being coupled mechanically to the movement of the winding drum 12. In that way, the winding-on point of the line 1 on the winding drum 12, here for example on the profiling 13 during the rotation thereof, is displaced in the axial direction to the desired extent parallel to the axis of rotation A. To protect the line 1, the guide head 14A has oppositely disposed guide rollers for the line 1. FIG. 1B further shows a view in longitudinal section along the axis of rotation A of a drive device 16, in the form of a coil spring drive with a coil spring 16A which is wound up around the axis of rotation A for automatic winding of the line 1 on the winding drum 12. The drive device 16 can be of any suitable kind as is known, for example, for cable winders. FIG. 1C further shows an automatic winding device 17 which is operatively connected to the drive device and which has a reverse-motion lock, here in the form of a locking pawl mechanism 17A at the inside of the external tooth arrangement 14C and extending around the drive device 16. The automatic winding device 17 with reverse-motion lock 17A can be of any per se known configuration and serves for arresting the winding drum 12 upon manual unwinding of the line and also upon retro-fitment of the line 1 with the drum device 10. By a brief jerky pull on the line 1, the arresting action can be released and the line 1 is automatically wound on again by the coil spring 16A which is tensioned upon unwinding. By virtue of the reverse-motion lock 17A the winding drum 12 can be arrested in different positions against the spring force of the spring 16A.

As FIG. 1B shows the winding drum 12 which is here constructed with a peripheral cylindrical surface has an internal space 12B. For interruption-free guidance of the line 1, an inner rotary guide, here a belt-like line guide device 18, is completely accommodated in the internal space 12B, for receiving the line 1. The line guide device 18 is shown diagrammatically in FIG. 1G, there illustrating purely by way of example a continuous belt, but a structure comprising individual assembled members is also possible. In regard to the structure of the line guide device 18, the teaching of WO 2011/086198 A2 is incorporated herein by reference for the sake of brevity.

Depending on the respective rotary position the line guide device 18 forms first spiral layers 18A in which a received line 1 is wound in a first winding direction about the axis of rotation A and second spiral layers 18B in which the received line 1 is wound in the opposite direction in the second winding direction about the axis of rotation, see FIG. 1G. A position-variable direction-changing arc 18C moves axially, and optionally peripherally, between the spiral layers 18A, 18B upon rotation. The direction-changing arc 18C connects the two spiral layers 18A, 18B and with a predetermined radius of curvature ensures that the winding direction or the direction of rotation of the line 1 about the axis of rotation A is reversed. By virtue of the line guide device 18, the line 1 can be retro-fitted with the winding device 10 in interruption-free fashion and without being severed. For simplified retro-fitment, the individual segments or members of the line guide device 18 respectively form a radially outwardly open gap 18D which is continuous in the direction in which the line extends and is elastically expandable. The line guide device 18 is preferably made from plastic. The winding spacing in the axial direction of the profiling 13 and the maximum receiving cross-section of the line guide device 18, here the free structural height of the receiving space (FIG. 1A) defined by the segments or members, are selected to be mutually matching so that the smallest and also the maximum receivable cross-section of a line 1 can be wound in controlled fashion.

The line guide device 18 is fixed with one end or the spiral layers 18B at a rotary point R which is provided on a coupling flange 19A at a first end of the winding drum 12. With the other end or the spiral layers 18A, the line guide device 18 is fixed at a fixed point F which is non-rotatable with respect to the frame 11 and which is provided on a plate-like or disc-like holding portion 19B at the opposite end of the winding drum 12.

The holding portion 19B is in the form of a support disc and is non-rotatably connected in the assembled position to the holding plate 11B by an end projection 19C on the holding portion 19B engaging in positively locking relationship into an outwardly open receiving means in the holding plate 11B, as is shown by a comparison of FIG. 1A to FIGS. 1D-1E. The holding portion 19B thus forms the fixed point F which is fixed with respect to the frame.

At the periphery thereof the holding portion 19B forms a support region in the form of a circular ring with peripherally distributed support rollers 19D on which the inside of the second end of the winding drum 12 rolls or is rotatably mounted in supported relationship.

Figure 1D:
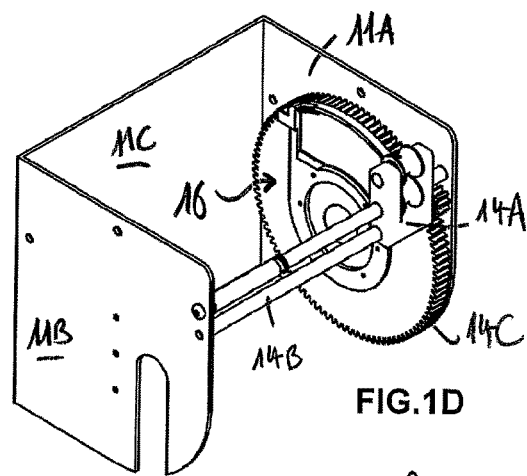
Figure 1F:
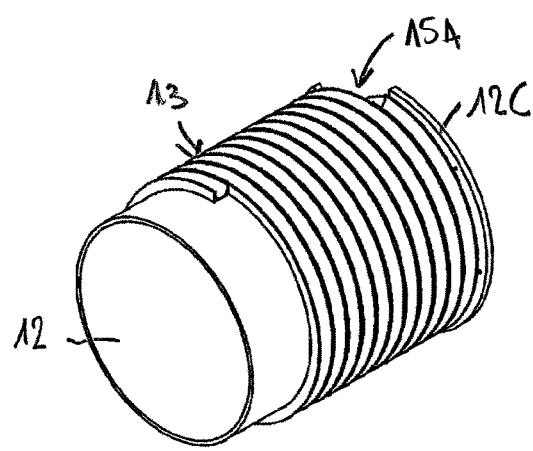
Figure 1E:
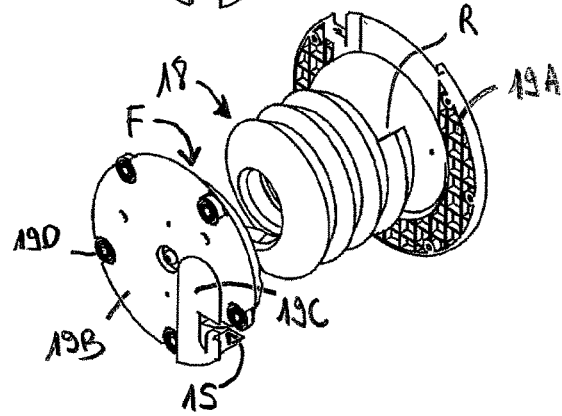

The opposite first end of the winding drum 12 is connected releasably to the coupling flange 19A, as FIGS. 1E-1F show. The coupling flange 19A forms the rotary point R and, by way of an end mounting means, is connected non-rotatably but easily releasably in the radial direction to the driven side of the drive device 16, as FIGS. 1D-1E show. The coupling flange 19A, the line guide device 18 and the holding portion 19B connected to form a guide unit can be easily removed axially from the winding drum 12 (see FIGS. 1E-1F) after the positively locking connection between the coupling flange 19A or the holding portion 19B and the frame 11 and possibly an associated securing means, for example by a cotter or screw, has been released (not shown) and the fixing of the end flange 12C of the winding drum 12 was separated from the coupling flange 19A, for example by release of a screw connection, latching connection or the like. In that way the line 1 can be subsequently easily introduced into the line guide device 18.

Furthermore FIGS. 1E-1F show in the winding drum 12 a first aperture or opening 15A which opens at the end approximately in the axial direction with respect to the axis of rotation A, and a second aperture or opening 15B on the holding portion 19B, which opens outwardly in the radial plane perpendicularly to the axis of rotation A, although here not exactly radially. By virtue of the openings 15A, 15B a line 1 which is to be wound can be guided by the winding drum 12 or from the outside into the internal space 12B therein and can be passed out of same again and can also be subsequently easily laid therein.

Figure 2A:
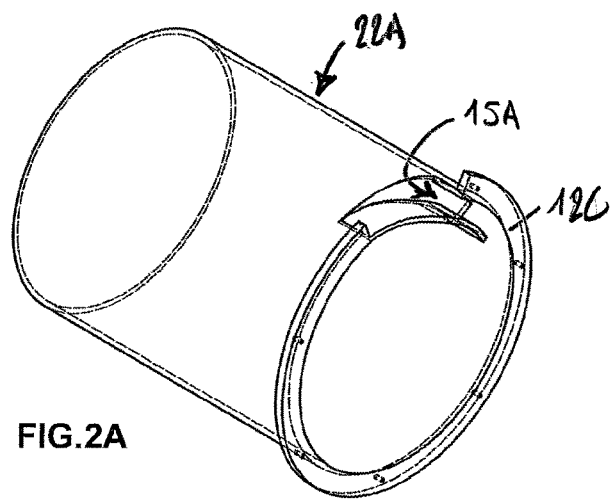
FIGS. 2A-2C show different embodiments of a winding drum for use in a winding device according to the invention, for example as shown in FIGS. 1A-1G, in each case as a perspective view.
Figure 2B:
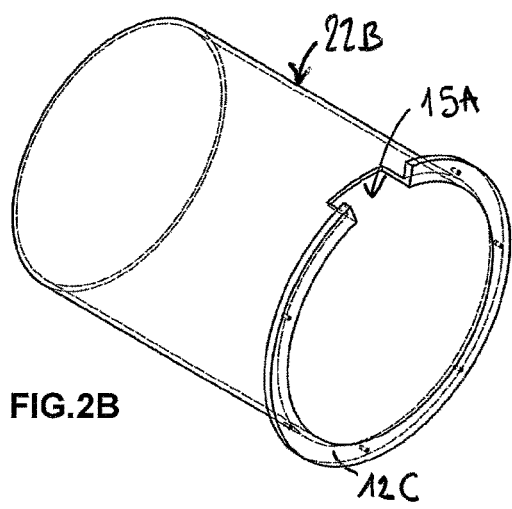

FIGS. 2A-2B show different variants of winding drums 22A, 22B, 22C which can be used in equivalent fashion in a winding device 10, for example as shown in FIGS. 1A-1G, and which here are in the form of substantially circular-cylindrical drums.

The winding drum 22A in FIG. 2A has at the end flange 12C an aperture or opening 15A which opens in the axial direction and which also has a holding tongue 23 which extends radially inwardly along the opening 15A serving as anti-kink protection for the line 1 and for fixing a strain-relief means (not shown) for the line 1.

The winding drum 22B in FIG. 2B, at the end flange 12C, has an aperture or opening 15A which is in the form of a simple approximately rectangular cut-out, extending axially to the end and also interrupting or passing through the end flange 12C.

Figure 2C:
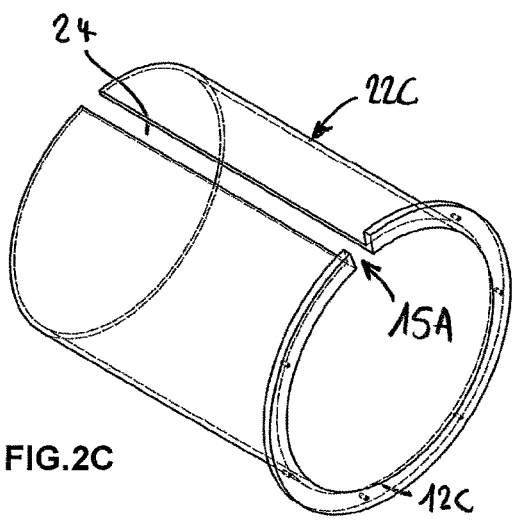

Finally, the winding drum 22C in FIG. 2C has an insertion slot 24 for insertion of a line 1, the slot 24 extending continuously in the axial direction between both ends and transitioning into or being formed by the opening 15A, at the first end or at the end flange 12C. The winding drum 22C in particular allows even a line 1 which is already fixedly connected at both ends to be subsequently fitted with the winding device, or however it also allows fitment of a line 1, in relation to which there are connected units or plugs 25 (only quite diagrammatically shown in FIGS. 3-4), of dimensions which cannot be passed through a winding drum 22A or 22B as shown in FIGS. 2A-2B.

Figure 3:
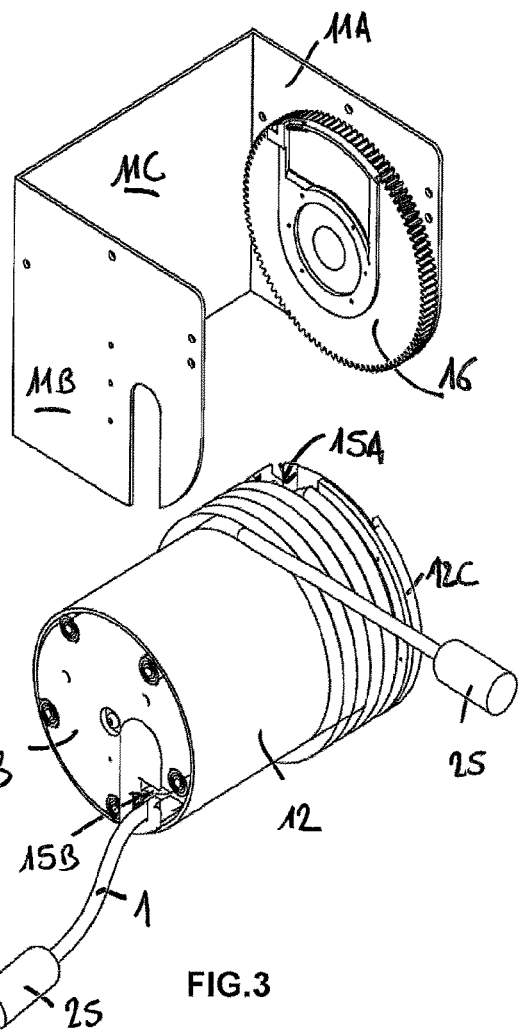
FIG. 3 shows a second simplified embodiment of a winding device which is supported at both sides.

FIG. 3 shows a modification of FIGS. 1A-1G which differs in particular in that there is no profiling 13 and no winding adjustment mechanism 14 and is otherwise of the same structure. FIG. 3 diagrammatically shows ready-made plug devices or units which are pre-installed on the line 1, as generally indicated by reference 25.

Figure 4:
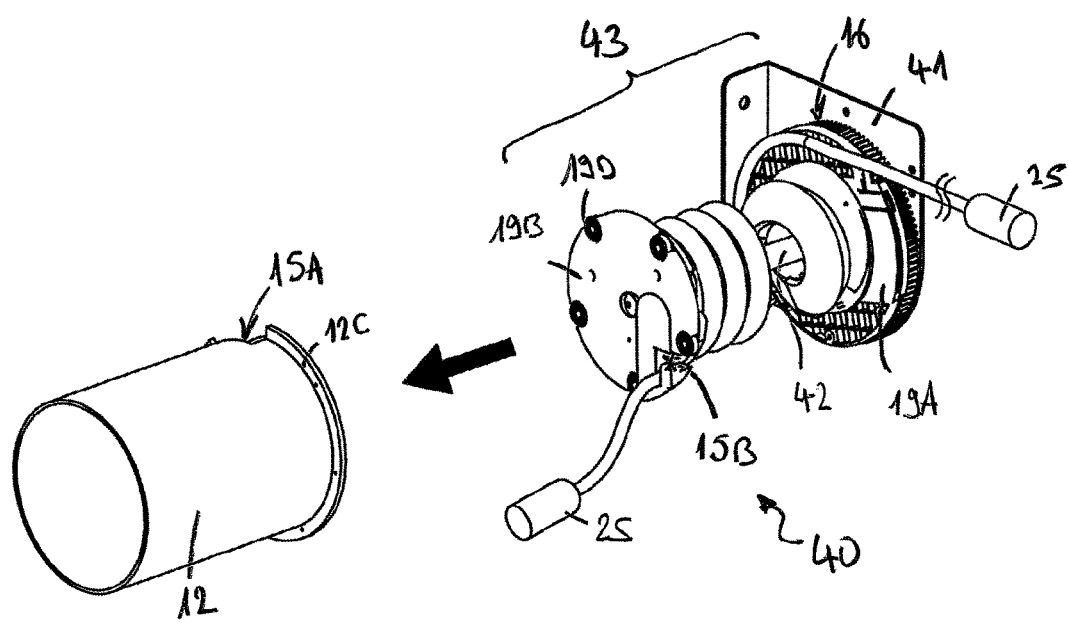
FIG. 4 shows a third embodiment with a winding device which is supported at one side in a partially exploded or dismantled condition as a perspective view.

FIG. 4 shows a variant of the guide device 40 in relation to which the coupling flange 19A, the line guide device 18 and the holding portion 19B are fixedly connected to form a guide unit 43 and the guide unit 43 is supported in cantilever relationship at a frame 41 which supports it only at one side. Here only the winding drum 12 or 22A, 22B or 22C has to be dismantled in order to install a line 1 in the winding device 40. In the case of this structural configuration with a guide unit 43 fixed to the frame 41 at one side in the manner of a cantilevered boom or cantilever arm the arrangement has a coaxial holding shaft 42, with which the holding portion 19B is secured fixedly to the frame 41, in particular non-rotatably. Accordingly here there is no need for a releasable interface between the coupling flange 19A and the drive 16, that is to say in this simplified design the coupling flange 19A directly forms the driven side of the drive 16 which otherwise can be designed as shown in FIGS. 1B-1C.

Other features of the alternative embodiments as shown in FIGS. 3-4, in particular the openings or through-apertures at both ends as shown at 15A and 15B respectively, correspond to the structure described hereinbefore as shown in FIGS. 1A-1C.

The invention claimed is:

1. A winding device (10) for winding and unwinding a flexible line (1) comprising:
    a frame (11) configured to be stationarily mounted;
    a hollow-cylindrical winding drum (12) mounted to the frame rotatably about an axis of rotation (A), the winding drum (12) forms an internal space and has an outside (12A) on to and from which a line can be wound and unwound;
    an inner rotary guide (18) for interruption-free guidance of the line (1) from a fixed point (F) which is fixed with respect to the frame to a rotary point (R) which is rotationally fixed to the winding drum (12) and is relatively rotatable about the axis of rotation with respect to the fixed point, and
    wherein the rotary guide between the fixed point and the rotary point predetermines a line path with two oppositely directed windings (18A, 18B) with a first winding direction about the axis of rotation (A), a direction-changing means (18C) which is rotatable about the axis of rotation and in which the line is changed over from the one winding (18A) into the other winding (18B) and a second winding direction in opposite relationship to the first winding direction;
    wherein the inner rotary guide (18) is accommodated at least predominantly in the internal space (12B) of the winding drum (12);
    wherein the winding drum (12) includes a first opening (15A) at a first end, on the side of which the rotary point (R) of the inner rotary guide (18) is provided, which opening (15A) opens out at the first end in the axial direction with respect to the axis of rotation (A), and that provided at the opposite second end is a holding portion (19B) which is non-rotatably connected to the frame and which has a second opening (15B) which opens outwardly in a radial plane perpendicularly to the axis of rotation (A) so that a line (1) to be wound can be laid from the outside through the first opening to the rotary point (R) in the inner rotary guide, in the inner rotary guide and from the fixed point (F) thereof through the second opening and vice-versa.

2. The winding device according to claim 1, wherein the inner rotary guide has a line guide device (18) for receiving the line and wherein the line guide device forms one or more first spiral layers (18A) in which the line is wound about the axis of rotation in the first winding direction, one or more second spiral layers (18B) in which the line is wound in the opposite direction about the axis of rotation in the second winding direction, and a direction-changing arc (18C) which connects the two spiral layers and in which the received line (1) is changed over.

3. The winding device according to claim 2, wherein the line guide device (18) is composed of individual members which each have at the radial outside a continuous gap which can be expanded to insert the line into the respective member.

4. The winding device according to claim 1, wherein the inner rotary guide (18) is connected to the holding portion (19B) to provide a guide unit, wherein the guide unit and the winding drum are releasable from each other.

5. The winding device according to claim 1, wherein
    the winding drum (12) is of a one-piece configuration; or
    the winding drum is of a multi-part structure comprising a number of releasably connected individual parts; or
    the winding drum comprising a cylindrical casing comprising at least two casing portions which can be releasably connected; or
    the winding drum (22C) has an insertion slot (24) for the insertion of the line, which slot starts from the first opening (15A) and extends continuously to the second end; or
    the winding drum (12) is mounted to the frame (11) releasably at the first end of the drum via a coupling flange (19A).

6. The winding device according to claim 5, further comprising a drive device (16) on the frame (11), the drive device (16) which in the assembled position is torque-transmittingly coupled to the first end of the winding drum (12).

7. The winding device according to claim 6, wherein the drive device includes a spring drive (16A) for automatically winding on.

8. The winding device according to claim 1, wherein the holding portion is a support disc (19B) with a support region which at least region-wise is in the form of a circular ring and at which the second end of the winding drum (12) is slidingly or rollingly rotatably mounted on which an inside of the winding drum (12) is rotatably mounted and/or the holding portion (19B) forms the fixed point (F) that is fixed with respect to the frame of the inner rotary guide.

9. The winding device according to claim 1, wherein
    the frame (11) has two oppositely disposed holding plates (11A, 11B), between which the ends of the winding drum (12) are held; or
    the frame has precisely one holding plate at the first end of the winding drum, wherein the holding portion is fixed in opposite relationship to a holding shaft which is coaxial with the axis of rotation (A).

10. The winding device according to claim 1, wherein there is provided a winding adjustment mechanism (14) with a guide head (14A) which is displaceable parallel to the axis of rotation for guiding a line during the winding-on operation, wherein the guide head is coupled to the rotary movement of the winding drum (12) by way of a transmission, so that the winding-on point of the line (1) on the winding drum is displaced in the axial direction during rotation of the winding drum.

11. The winding device according to claim 10, wherein the transmission is a spindle drive (14B).

12. The winding device according to claim 1, wherein the winding drum includes a cylindrical casing with a spiral profiling (13) at the outside for winding on the line (1) in guided fashion.

13. The winding device according to claim 1, wherein the inner rotary guide, the winding drum and/or the holding portion at least predominantly include plastic parts.

14. The winding device according to claim 1, further including precisely one electrical control signal cable and/or power supply cable (1) which can be wound and unwound, that is guided interruption-free by the inner rotary guide (18) from the fixed point (F) to the rotary point (R).

15. Use of a winding device according to claim 1 for the stowage of the line and for winding the line on and off as required, the line which is ready-made or which is already connected at least at one end and/or the line connected to a portable device.

16. The winding device according to claim 1, wherein the inner rotary guide (18) is connected to the holding portion (19B) to provide a guide unit, wherein the guide unit and the winding drum are releasable from each other, wherein the guide unit is completely accommodated in the internal space in the winding drum.

17. The winding device according to claim 1, wherein the holding portion is a support disc (19B) with a support region which at least region-wise is in the form of a circular ring and at which the second end of the winding drum (12) is slidingly or rollingly rotatably mounted with support rollers (19D) on which an inside of the winding drum (12) is rotatably mounted and/or the holding portion (19B) forms the fixed point (F) that is fixed with respect to the frame of the inner rotary guide.

* * * * *